(12) United States Patent  
Snekkevik et al.

(10) Patent No.: US 7,690,936 B1  
(45) Date of Patent: Apr. 6, 2010

(54) SUBSEA ELECTRICAL PENETRATOR

(75) Inventors: Tore Daae Snekkevik, Isdalstø (NO); Tareq Zead Aljumylee, Bergen (IQ); Magne Oldervoll, Os (NO); Leon Lovheim, Bergen (NO)

(73) Assignee: Octio Geophysical AS, Bergen (NO)

( * ) Notice: Subject to any disclaimer, the term of this patent is extended or adjusted under 35 U.S.C. 154(b) by 0 days.

(21) Appl. No.: 12/392,954

(22) Filed: Feb. 25, 2009

(51) Int. Cl.
 *H01R 13/52* (2006.01)
(52) U.S. Cl. .................. 439/281; 439/201; 439/587
(58) Field of Classification Search .............. None
 See application file for complete search history.

(56) References Cited

U.S. PATENT DOCUMENTS

| | | | | |
|---|---|---|---|---|
| 3,998,515 | A * | 12/1976 | Panek | 439/198 |
| 4,626,721 | A * | 12/1986 | Ouchi | 310/71 |
| 4,948,377 | A * | 8/1990 | Cairns | 439/200 |
| 5,203,805 | A * | 4/1993 | Cairns | 439/199 |
| 5,267,869 | A * | 12/1993 | Nadasky et al. | 439/125 |
| 6,545,583 | B1 * | 4/2003 | Palmer | 336/192 |
| 7,442,081 | B2 * | 10/2008 | Burke et al. | 439/589 |

* cited by examiner

*Primary Examiner*—Michael C Zarroli
(74) *Attorney, Agent, or Firm*—Wong, Cabello, Lutsch, Rutherford & Brucculeri, LLP

(57) ABSTRACT

An electrical penetrator for subsea use has an annular cavity between the connector pin and the body of the penetrator that is filled with a dielectric oil which may act as a pressure compensator. In certain embodiments, a plurality of nested boot seals provide a watertight seal between an electrical cable and the body of the penetrator. An inner boot seal has a stepped inner diameter which engages a central, axial, connector pin and at least one wall of a cylindrical projection or an annular recess formed in the external face of the penetrator body. An outer boot seal has a stepped inner diameter which provides a watertight seal to an attached electrical cable, the connector pin and an outer segment of the inner boot seal.

29 Claims, 4 Drawing Sheets

SUBSEA ELECTRICAL PENETRATOR

CROSS-REFERENCE TO RELATED APPLICATIONS

NONE

STATEMENT REGARDING FEDERALLY SPONSORED RESEARCH OR DEVELOPMENT

NOT APPLICABLE

BACKGROUND OF THE INVENTION

1. Field of the Invention

This invention relates to electrical connectors. More particularly, it relates to electrical connectors specially adapted for subsea use.

2. Description of the Related Art including information disclosed under 37 CFR 1.97 and 1.98

In the subsea environment, providing an electrical penetration—a power or signal connection through the wall of a vessel or housing—presents a number of difficulties. Water pressure increases with depth. For example, at a 12,000-ft water depth, subsea equipment is subjected to a pressure of 5350 psi from the water column. Since the interior of a vessel, pod or housing will often be maintained at atmospheric pressure (to facilitate assembly and service at the surface), a substantial pressure differential typically exists across an electrical penetrator installed in the vessel wall when the device is deployed in the ocean. Seawater will move under the influence of the pressure differential into the vessel through any leak pathway in the penetrator.

One representative example of subsea electrical penetrator application is an underwater electrical cable on the seafloor which connects to a pod containing one or more sensors—e.g., a hydrophone. Power to the sensors and signals from the sensors must pass through the wall of the pod in order to connect with the subsea cable. An electrical penetrator provides a watertight, electrically insulated connection through the exterior wall of the pod.

One example of a subsea electrical penetrator of the prior art is shown in FIG. 1. Penetrator 10 is shown installed in wall 12 of an undersea pod, housing or similar vessel. Penetrator 10 comprises generally cylindrical body 14 having a central axial bore 13. Cylindrical projection 15, which is coaxial with bore 13, extends from face 28 of body 14. Connector pin 16 passes through bore 13 and projection 15 generally on the axis of each and spaced apart from the interior walls of bore 13 and projection 15. Connector pin 16 is an electrical conductor which may be adapted for solder-type, crimp-type or other such electrical connections at one or both ends. Glass seal 20 surrounds connector pin 16, mechanically connecting it to penetrator body 14 while providing electrical insulation from penetrator body 14. Outer insulator 22 substantially fills the annular space between pin 16 and the inner wall of projection 15. Insulator 22 typically comprises a thermoplastic or thermoset dielectric material.

Conductor 19 of cable 18 (which may be an undersea cable) is electrically connected to pin 16 at external connector 24. The opposing end of pin 16 has internal connector 26 for connecting to a conductor within the pod, housing or vessel in which penetrator 10 is installed.

Boot seal 30 surrounds that portion of connector pin 16 which extends beyond penetrator body 14. Boot seal 30 is typically fabricated from natural or synthetic rubber such as Neoprene or polychloroprene. Boot seal 30 of prior art penetrator 10 is comprised of outer section 32, which engages jacket 17 of cable 18, middle section 34, which seals to the outer surface of connector pin 16, and inner section 36 which engages the outer wall of projection 15. Ideally, each of these engagements provides a watertight seal.

It has been found, in practice, that the mechanical seals of a penetrator 10 do not always provide a watertight seal over time in deep water. Leakage around connector pin 16 and into cable 18 may occur. The present invention provides an improved watertight seal between both the cable and the penetrator and between the penetrator and the vessel, housing or pod on which it is installed.

BRIEF SUMMARY OF THE INVENTION

An electrical penetrator for subsea use according to the present invention has an oil-filled chamber to provide pressure compensation which resists the intrusion of seawater and may have a plurality of nested boot seals which provide watertight seals between an electrical cable and the body of the penetrator.

An annular cavity between the connector pin and the body of the penetrator may be filled with a dielectric oil which may act as a pressure compensator. In certain embodiments, an annular cavity between the inner boot seal and the outer boot seal may be filled with a gel material.

In one particular preferred embodiment, an inner boot seal has a stepped inner diameter which engages a central, axial, connector pin in the penetrator and the outer wall of a cylindrical projection on the external face of the penetrator body. An outer boot seal has a stepped inner diameter which provides watertight seals to an attached electrical cable, the connector pin and an outer segment of the inner boot seal.

BRIEF DESCRIPTION OF THE SEVERAL VIEWS OF THE DRAWING(S)

DETAILED DESCRIPTION OF THE INVENTION

An apparatus according to the invention comprises a glass-sealed penetrator in combination with a pressure-compensated boot seal system. Such an apparatus may be used to bring electric conductors from the pressurized "wet side" of the system and into a "dry side" at atmospheric pressure.

Figure 1:
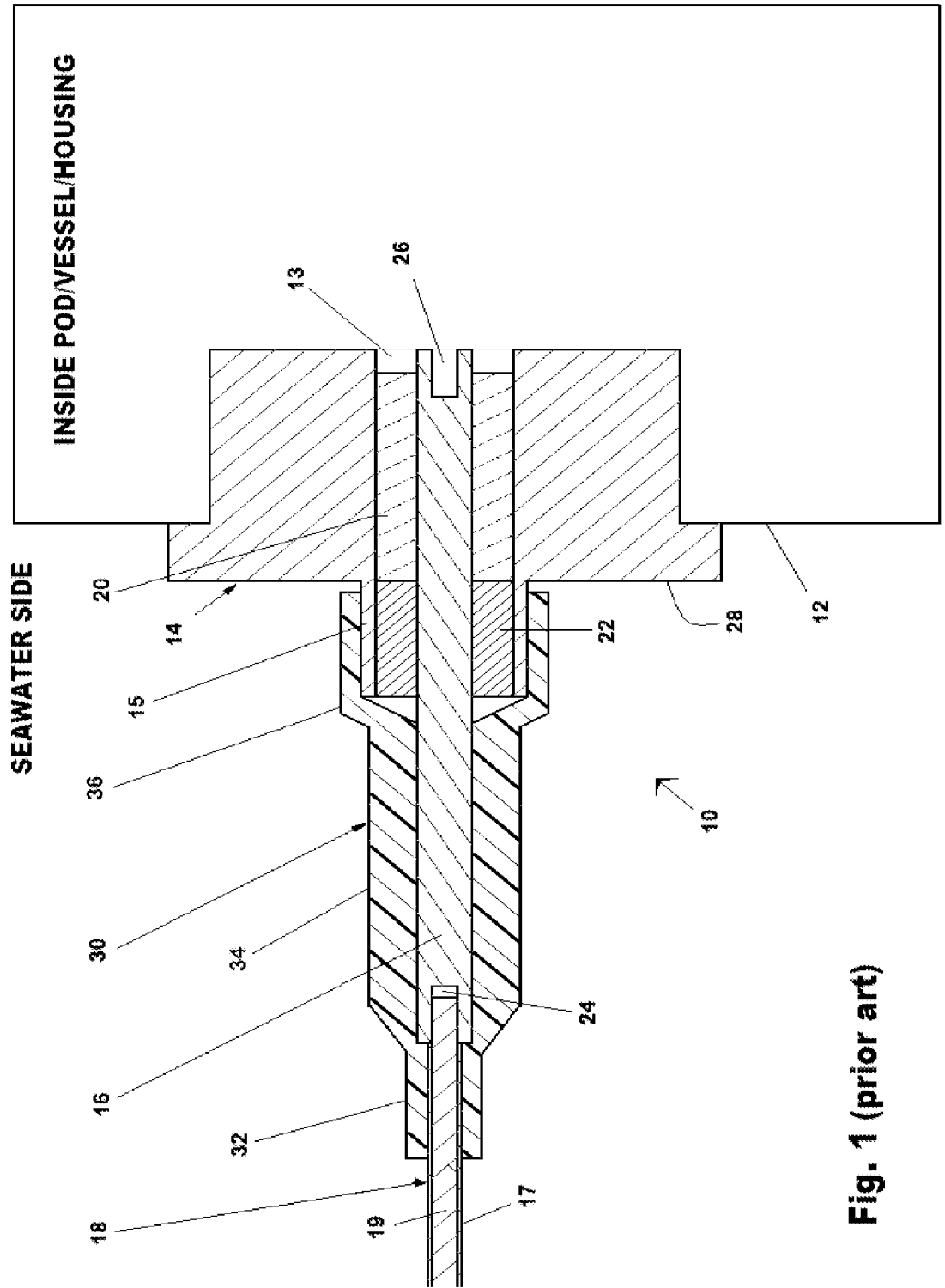
FIG. 1 is a cross-sectional view of a subsea electrical penetrator of the prior art.
Figure 2:
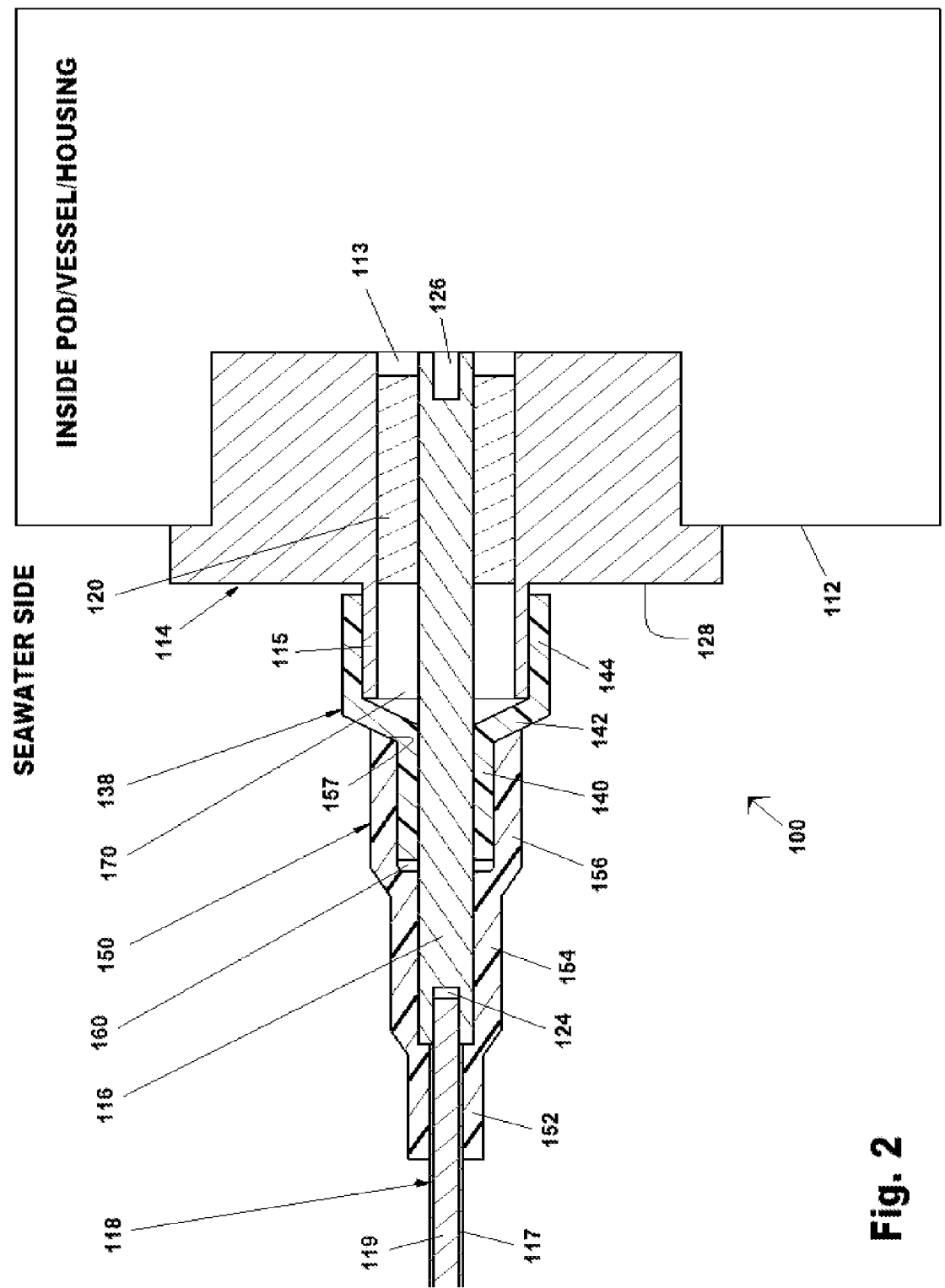
FIG. 2 is a cross-sectional view of a subsea electrical penetrator according to a first embodiment of the invention.

The invention may best be understood by reference to illustrative embodiments. One particular preferred embodiment of the invention is shown in FIG. 2. As in the case of penetrator 10 of the prior art discussed above, electrical penetrator 110 comprises generally cylindrical body 114 which may be installed in a watertight manner in exterior wall 112 of an undersea pod, housing, vessel or the like. Body 114 has central axial bore 113 extending from a first, external face to a second, opposing, internal face thereof. Cylindrical projection 115, which is coaxial with bore 113, extends from face 128 of body 114. Connector pin 116 is mounted within bore 113 using glass seal 120. Glass seal 120 mechanically secures pin 116 within bore 113 and electrically isolates it from body 114. As is well known in the art, other dielectric materials may also be used for this purpose.

Connector pin 116 may comprise exterior connection 124 at a first end thereof and interior connection 126 at an opposing second end. Connections 124 and 126 may be configured for solder-type connections, crimp-type connections or other means for making an electrical connection between pin 116 and a wire or cable. In the illustrated embodiment, cable 118 comprised of electrical conductor 119 within insulating jacket 117 is attached to pin 116 at exterior connection 124. In use, the electrical signal or power path would continue through penetrator 100 to another conductor attached at connection 126.

Inner boot seal 138 is comprised of three sections—smaller diameter section 140 is sized to fit in watertight engagement with pin 116; larger diameter section 144 is configured to engage the outer wall of projection 115 in a watertight manner; and, transition section 142 connects sections 140 and 144.

Inner boot seal 138 may be fabricated using any suitable material. One particular preferred material is an elastomer. An elastomer is a polymer with the property of elasticity. The term is derived from elastic polymer and is often used interchangeably with the term "rubber" which usually refers to vulcanisates. Natural rubbers and/or synthetic rubbers may be used. Each of the monomers which link to form the polymer is usually made of carbon, hydrogen, oxygen and/or silicon. Elastomers are amorphous polymers existing above their glass transition temperature, so that considerable segmental motion is possible. At ambient temperatures rubbers are thus relatively soft (Young's Modulus (E) ~3 MPa) and deformable. Their primary uses are for seals, adhesives and molded flexible parts.

Elastomers are usually thermosets (requiring vulcanization) but may also be thermoplastic. The long polymer chains cross-link during curing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Temperature effects are also present in the demonstrated elasticity of a polymer. Elastomers that have cooled to a glassy or crystalline phase will have less mobile chains, and consequentially less elasticity, than those manipulated at temperatures higher than the glass transition temperature of the polymer.

It is also possible for a polymer to exhibit elasticity that is not due to covalent cross-links, but instead for thermodynamic reasons.

Outer boot seal 150 has a portion which is distal from inner boot seal 138 and a portion which overlaps section 140 of inner boot seal 138. Outer boot seal 150 may comprise a plurality of sections. In the illustrated embodiment, outer boot seal comprises three sections, each having both a different inside and outside diameter from the adjacent section(s). Small diameter section 152 may have an inner diameter sized to engage cable 118 in watertight fashion. Intermediate diameter section 154 may have an inner diameter sized to engage pin 116 in watertight fashion. Large diameter section 156 may have an inside diameter sized to engage the outer diameter of smaller diameter section 140 of inner boot seal 138 in watertight fashion. The end 157 of section 156 may be configured to engage transition section 142 of inner boot seal 138.

As shown in FIG. 2, a cavity 160 may exist between the outer face of inner boot seal 38 and the surrounding portions of outer boot seal 150. In certain preferred embodiments, this volume 160 may be filled with a suitable gel material—a substantially dilute crosslinked system, which exhibits no flow when in the steady-state. The gel may act to prevent water intrusion if the boot seal is breached, and may also buffer the penetrator against mechanical damage if it is flexed during installation or deployment. In yet other embodiments, volume 160 may be filled with a dielectric oil.

As may also be seen in the embodiment illustrated in FIG. 2, annular space 170 may exist between the outer surface of connector pin 116 and the inner wall of projection 115—the wall of central axial bore 113. The innermost extent of this space 170 is delimited by one end of glass seal 120 and the outer boundary is defined by the inner side of transition section 142 of inner boot seal 138. Space 170 may be filled with a suitable oil. This may be accomplished by installing inner boot seal 138 onto body 114 while both are submersed in oil.

Examples of suitable oils include silicone oils (polymerized siloxanes) such as those sold and marketed under the DOW CORNING brand and "transformer oils" such as mineral oil. Mineral oil or "liquid petroleum" is a by-product in the distillation of petroleum to produce gasoline and other petroleum based products from crude oil. It is a transparent, colorless oil composed mainly of alkanes (typically 15 to 40 carbons) and cyclic paraffins, and is related to white petrolatum. It has a density of around 0.8 g/cm3. There are three basic classes of mineral oils: paraffinic oils, based on n-alkanes; naphthenic oils, based on cycloalkanes; and, aromatic oils, based on aromatic hydrocarbons. Other suitable oils include natural ester based (NEB) transformer insulating fluids. These base fluids are also known as vegetable seed oils. The oil may be both hydrophobic (immiscible with water) and a dielectric.

Oil retained within annular space 170 may act as a pressure compensator for penetrator 100. It is contemplated that the flexible nature of inner boot seal 138, and particularly transition segment 142, allows the subsea ambient water pressure to be exerted on the oil in annular space 170. Thus, there is little or no pressure differential between the oil and the surrounding seawater, which, together with the hydrophobic properties of the oil, acts to prevent the intrusion of water into penetrator 100.

A subsea penetrator according to the embodiment illustrated in FIG. 2 may be fabricated and assembled as follows. Body 114 having cylindrical projection 115 may be molded and/or machined to fit the opening in face 112 of the housing, pod or vessel into which it will be installed. A central, axial bore may be molded or machined into penetrator body 114 extending through cylindrical projection 115 to the inner face of penetrator body 114.

Connector pin 116 may be mounted in the central axial bore with a dielectric material. In one particular preferred embodiment, the pin, having a first, external end that extends beyond the first face of the penetrator body and a second, internal end that is generally co-planar with the second face of the penetrator body, may be positioned on the central axis of the penetrator body such that a generally annular space is provided between a portion of the connector pin 116 and the interior wall of the central axial bore 113. Molten glass may then be used to fill at least a portion of the generally annular space and allowed to cool and solidify, thereby securing pin 116 in body 114 in an electrically insulated manner.

Subsequent to installation of pin 116, generally cylindrical body 114 with the connector pin 116 mounted therein may be submersed in dielectric oil. The object of this submersion is to fill annular volume 170 with oil. To that end, air may be purged from volume 170 after immersing the generally cylindrical body 114 in oil.

While still immersed in the oil, one may then install inner boot seal 138 such that smaller diameter section 140 is in sealing engagement with the connector pin and larger diameter section 144 is in sealing engagement with the outer wall of projection 115 such that chamber 170 is filled with oil.

Following installation of inner boot seal 138, body 114 (with pin 116 and inner boot seal 138 installed) may be removed from the oil and conductor 119 of cable 118 may be affixed to electrical connection 124 by, for example, soldering or crimping.

Outer boot seal 150 may be slid over sheath 117 of cable 118 until end 157 contacts segment 142 of inner boot seal 138. Outer boot seal 150 is preferably sized and configured to provide substantially watertight seals between small diameter section 152 and cable 118, between intermediate diameter section 154 and connector pin 116 and between large diameter section 156 and section 140 of inner boot seal 138. Optionally, a gel material may be applied to the outer diameter of connector pin 116 and/or the inner surface of large diameter section 156 of outer boot seal 150 prior to the installation of outer boot seal 150 such that volume 160 is substantially filled with the gel material when penetrator 100 is fully assembled.

Figure 3:
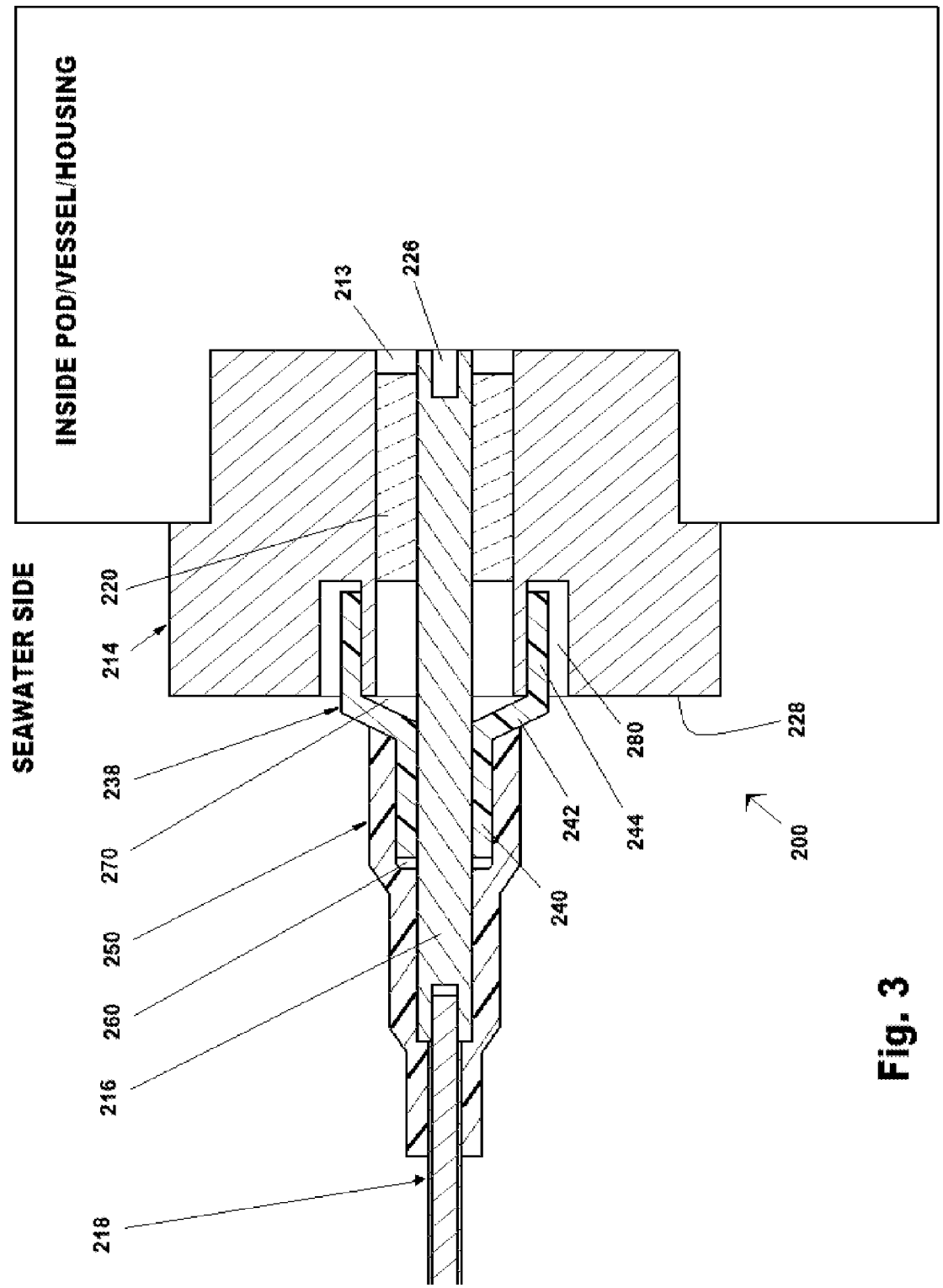
FIG. 3 is a cross-sectional view of a subsea electrical penetrator according to a second embodiment of the invention.

A subsea penetrator according to a second embodiment of the invention is shown in FIG. 3. In this embodiment penetrator 200 has an annular recess 280 in face 228 of body 214 in lieu of cylindrical projection 115. Annular recess 280 may be concentric with central axial bore 213. This embodiment provides increased protection against mechanical damage to the surface of penetrator body 214 engaged by section 244 of inner boot seal 238. Inner boot seal 238 is comprised of three sections—smaller diameter section 240 is sized to fit in watertight engagement with pin 216; larger diameter section 244 is configured to engage the inner wall of annular recess 280 in a watertight manner; and, transition section 242 connects sections 240 and 244.

Elements of this embodiment that otherwise correspond to those of the embodiment illustrated in FIG. 2 are designated with reference numbers which differ by 100 from those in FIG. 2.

A penetrator 200 according to this second embodiment of the invention may be fabricated and assembled in the same manner as that described above for penetrator 100.

Figure 4:
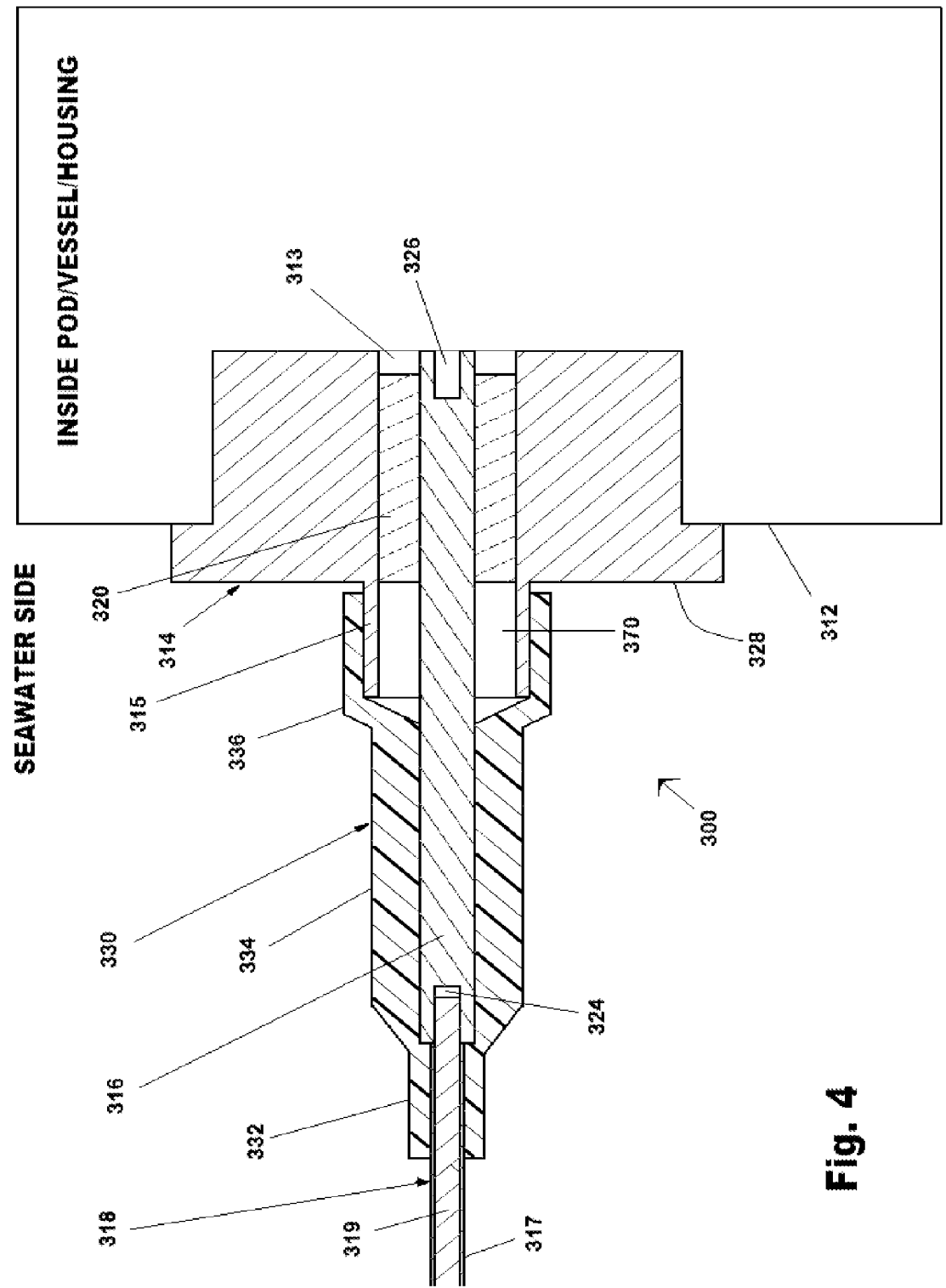
FIG. 4 is a cross-sectional view of a subsea electrical penetrator according to a third embodiment of the invention.

A subsea penetrator according to a third embodiment of the invention is shown in FIG. 4. In this embodiment penetrator 300 has a single boot seal but, unlike the penetrators of the prior art, penetrator 300 comprises oil-filled volume 370 which may act as a pressure compensator ensuring that little or no differential pressure exists between the surrounding seawater and the junction between connector pin 316 and boot seal 330.

Boot seal 330 of prior art penetrator 300 is comprised of outer section 332, which engages jacket 317 of cable 318, middle section 334, which seals to the outer surface of connector pin 316, and inner section 336 which engages the outer wall of projection 315. Ideally, each of these engagements provides a watertight seal. It will be appreciated by those skilled in the art that a penetrator according to the embodiment illustrated in FIG. 3 may similarly be configured with a single boot seal.

Elements of this embodiment that otherwise correspond to those of the embodiment illustrated in FIG. 2 are designated with reference numbers which differ by 200 from those in FIG. 2.

A penetrator 300 according to this third embodiment of the invention may be fabricated and assembled in the same manner as that described above for penetrator 100.

Although the invention has been described in detail with reference to certain preferred embodiments, variations and modifications exist within the scope and spirit of the invention as described and defined in the following claims.

What is claimed is:

1. An electrical penetrator comprising:
   a generally cylindrical body having a first, external face and a second, internal face, a generally cylindrical projection extending from the first face and coaxial with the body, and a central, axial bore extending through the body and the cylindrical projection;
   a connector pin mounted in the central axial bore with a dielectric material, the pin having a first, external end and a second, internal end;
   a first boot seal having a first segment in sealing engagement with the connector pin and a second segment connected to the first segment and in sealing engagement with the outer surface of the cylindrical projection; and,
   a second boot seal having a first segment in sealing engagement with the connector pin and an adjacent second segment in sealing engagement with the first segment of the first boot seal.

2. An electrical penetrator as recited in claim 1 further comprising a distal segment on the second boot seal said distal segment being connected to the first segment of the second boot seal and adapted for watertight sealing engagement with an electrical cable connected to the first end of the connector pin.

3. An electrical penetrator as recited in claim 1 wherein the first segment of the first boot seal has a first, smaller, internal diameter and the second segment of the first boot seal has a second, larger internal diameter.

4. An electrical penetrator as recited in claim 3 further comprising a transition segment joining the first segment and the second segment.

5. An electrical penetrator as recited in claim 1 further comprising a generally annular space bounded by the surface of the connector pin, the interior wall of the central, axial bore, the dielectric material mounting the connector pin in the central, axial bore and an interior surface of the first boot seal.

6. An electrical penetrator as recited in claim 5 further comprising a dielectric oil in the generally annular space.

7. An electrical penetrator as recited in claim 6 wherein the dielectric oil is selected from the group consisting of: silicone oil; mineral oil; and, vegetable seed oil.

8. An electrical penetrator as recited in claim 6 wherein the dielectric oil substantially fills the generally annular space.

9. An electrical penetrator as recited in claim 5 wherein the interior surface of the first boot seal is the interior surface of a transition segment connecting the first segment of the first boot seal and the second segment of the first boot seal.

10. An electrical penetrator as recited in claim 1 further comprising a generally annular space bounded by the surface of the connector pin, an interior wall of the second boot seal and the distal end of the first boot seal.

11. An electrical penetrator as recited in claim 10 further comprising gel material in the generally annular space.

12. An electrical penetrator as recited in claim 10 wherein the gel material is selected from the group consisting of hydrogels, organogels and xerogels.

13. An electrical penetrator as recited in claim 10 further comprising a dielectric oil in the generally annular space.

14. An electrical penetrator comprising:
a generally cylindrical body having a first, external face and a second, internal face, a central, axial bore extending through the body from the first face to the second face, and an annular recess open to the first face and generally coaxial with the central bore, the annular recess having an inner wall and an opposing outer wall;
a connector pin mounted in the central axial bore with a dielectric material, the pin having a first, external end and a second, internal end;
a first boot seal having a first segment in sealing engagement with the connector pin and a second segment connected to the first segment and in sealing engagement with the inner wall of the annular recess; and,
a second boot seal having a first segment in sealing engagement with the connector pin and an adjacent second segment in sealing engagement with the first segment of the first boot seal.

15. An electrical penetrator as recited in claim 14 further comprising a distal segment on the second boot seal said distal segment being connected to the first segment of the second boot seal and adapted for watertight sealing engagement with an electrical cable connected to the first end of the connector pin.

16. An electrical penetrator as recited in claim 14 wherein the first segment of the first boot seal has a first, smaller, internal diameter and the second segment of the first boot seal has a second, larger internal diameter.

17. An electrical penetrator as recited in claim 16 further comprising a transition segment joining the first segment and the second segment.

18. An electrical penetrator as recited in claim 14 further comprising a generally annular space bounded by the surface of the connector pin, the interior wall of the central, axial bore, the dielectric material mounting the connector pin in the central, axial bore and an interior surface of the first boot seal.

19. An electrical penetrator as recited in claim 18 further comprising a dielectric oil in the generally annular space.

20. An electrical penetrator as recited in claim 19 wherein the dielectric oil substantially fills the generally annular space.

21. An electrical penetrator as recited in claim 18 wherein the interior surface of the first boot seal is the interior surface of a transition segment connecting the first segment of the first boot seal and the second segment of the first boot seal.

22. An electrical penetrator as recited in claim 14 further comprising a generally annular space bounded by the surface of the connector pin, an interior wall of the second boot seal and the distal end of the first boot seal.

23. An electrical penetrator as recited in claim 21 further comprising a gel material in the generally annular space.

24. An electrical penetrator as recited in claim 21 further comprising a dielectric oil in the generally annular space.

25. An electrical penetrator comprising:
a generally cylindrical body having a first, external face and a second, internal face, a generally cylindrical projection extending from the first face and coaxial with the body, and a central, axial bore extending through the body and the cylindrical projection;
a connector pin mounted in the central axial bore with a dielectric material, the pin having a first, external end and a second, internal end;
a boot seal having a first segment in sealing engagement with the jacket of an electrical cable connected to the first end of the connector pin, a second segment connected to the first segment and in sealing engagement with at least a portion of the connector pin and a third segment connected to the second segment and in sealing engagement with the outer surface of the cylindrical projection; and,
a generally annular volume between the side surface of the connector pin and the wall of the central axial bore, said generally annular volume being substantially filled with a dielectric oil.

26. An electrical penetrator as recited in claim 25 wherein the dielectric oil is a hydrophobic oil.

27. A method for assembling an electrical penetrator adapted for subsea use comprising:
providing a generally cylindrical body having a first, external face and a second, internal face, a generally cylindrical projection extending from the first face and coaxial with the body, and a central, axial bore extending through the body and the cylindrical projection;
mounting a connector pin in the central axial bore with a dielectric material, the pin having a first, external end that extends beyond the first face of the penetrator body and a second, internal end such that a generally annular space is provided between a portion of the connector pin and the interior wall of the central axial bore;
submersing the generally cylindrical body with the connector pin mounted therein in a dielectric oil;
installing a first boot seal having a first segment in sealing engagement with the connector pin and a second segment connected to the first segment and in sealing engagement with the outer wall of the cylindrical projection such that the generally annular space between the connector pin and the interior wall of the central axial bore is filled with oil;
removing the generally cylindrical body from the oil;
installing a second boot seal having a first segment and an adjacent second segment such that substantially watertight seals are provided between the first segment and the connector pin and between the second segment of the second boot seal and the first segment of the first boot seal.

28. A method as recited in claim 27 wherein the oil is selected from the group consisting of silicone oil, mineral oil and vegetable seed oil.

29. A method as recited in claim 27 further comprising purging air from the generally annular space after immersing the generally cylindrical body in oil.

* * * * *